Figure 1:
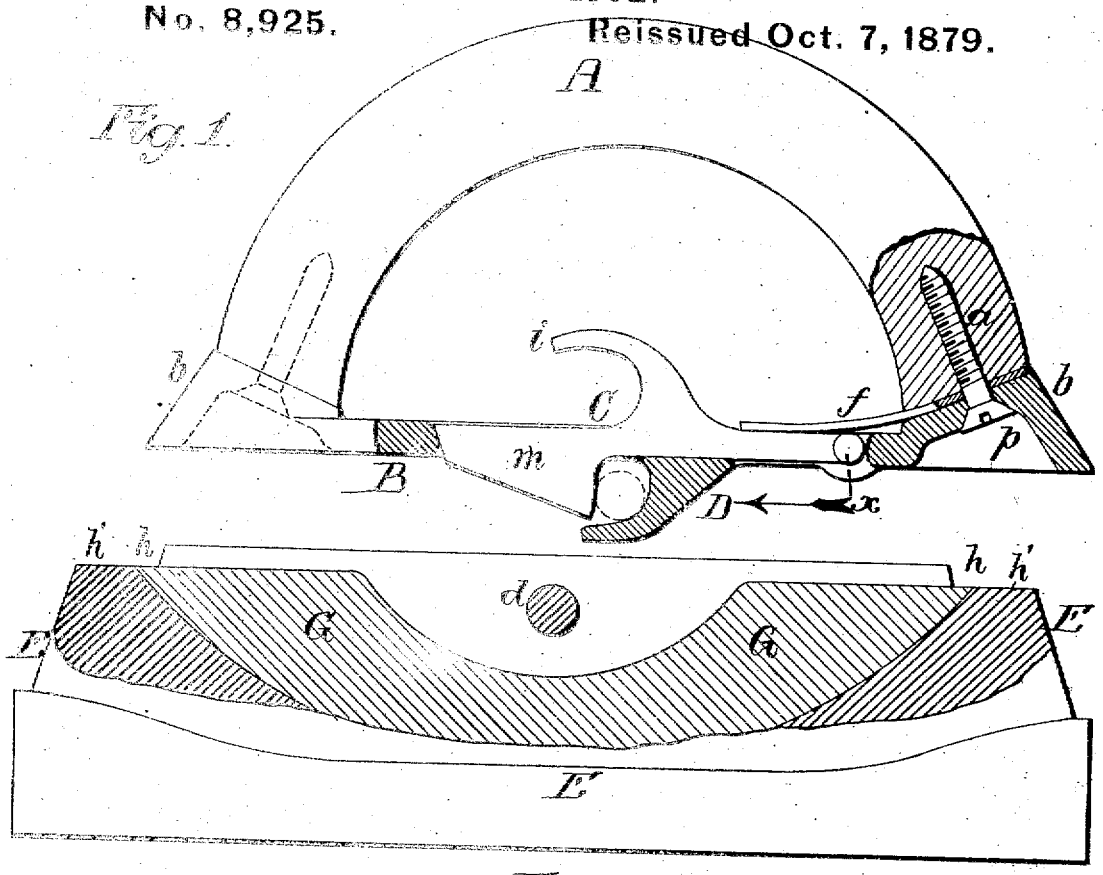

M. F. POTTS. 3 Sheets—Sheet 1.

Assignor, by mesne assignments, to THE ENTERPRISE MANUFACTURING CO., of Pennsylvania, and THE AMERICAN MACHINE CO., of Philadelphia, Pa.

Sad-Iron.

No. 8,925. Reissued Oct. 7, 1879.

Witnesses
Henry Haven Jr.
Harry Smith

Inventor
Mary F. Potts
by her Attorneys
Howson & Son

3 Sheets—Sheet 2.

M. F. POTTS.

Assignor, by mesne assignments, to THE ENTERPRISE MANUFACTURING CO., of Pennsylvania, and THE AMERICAN MACHINE CO., of Philadelphia, Pa.

Sad-Iron.

No. 8,925. Reissued Oct. 7, 1879.

Witnesses
Henry Howson Jr.
Harry Smith

Inventor
Mary F. Potts
by her Attorneys
Howson and Son

3 Sheets—Sheet 3.

M. F. POTTS.

Assignor, by mesne assignments, to THE ENTERPRISE MANUFACTURING CO., of Pennsylvania, and THE AMERICAN MACHINE CO., of Philadelphia, Pa.

Sad-Iron.

No. 8,925. Reissued Oct. 7, 1879.

Witnesses
Henry Howson Jr.
Harry Smith

Inventor
Mary F. Potts
by her Attorneys
Howson and Son

UNITED STATES PATENT OFFICE.

MARY FLORENCE POTTS, OF PHILADELPHIA, PENNSYLVANIA, ASSIGNOR, BY MESNE ASSIGNMENTS, TO THE ENTERPRISE MANUFACTURING COMPANY OF PENNSYLVANIA, AND THE AMERICAN MACHINE COMPANY, BOTH OF PHILADELPHIA, PENNSYLVANIA.

IMPROVEMENT IN SAD-IRONS.

Specification forming part of Letters Patent No. 113,448, dated April 4, 1871; Reissue No. 5,102, dated October 15, 1872; Reissue No. 8,925, dated October 7, 1879; application filed June 19, 1879.

*To all whom it may concern:*

Be it known that I, MARY F. POTTS, formerly of Ottumwa, county of Wapello, State of Iowa, but now of Philadelphia, Pennsylvania, did invent certain Improvements in Sad-Irons, for which Letters Patent No. 113,448 were granted to me April 4, 1871, and reissued to me October 15, 1872, No. 5,102; and I do hereby declare the following to be a full, clear, and exact description of the same.

My invention consists of the combination of a wooden handle, the top and legs of which form a continuous arch rounded transversely, with a metal plate secured directly to the bases of the arch, and serving the purpose of strengthening the wood and retaining it in place, and also of carrying mechanism by which the handle is connected to and disconnected from the base of the sad-iron, all substantially as described hereinafter.

My invention also consists in the peculiar manner (described hereinafter) of combining a plate with the arched handle of wood, so as to insure the secure attachment of the two together; also, of the combination of a base having a recess and a cross piece or bar therein, with a handle having latching and releasing mechanism adapted to the said recess and cross-piece, as explained hereinafter; also, of the peculiar construction (described hereinafter) of the latching and releasing mechanism.

My invention also consists of the combination of a base pointed at both ends and a detachable handle arched and made alike at both ends with central latching mechanism available for locking the handle in either of two positions to the base, and thus permitting the instant application of the handle to the same.

Figure 2:
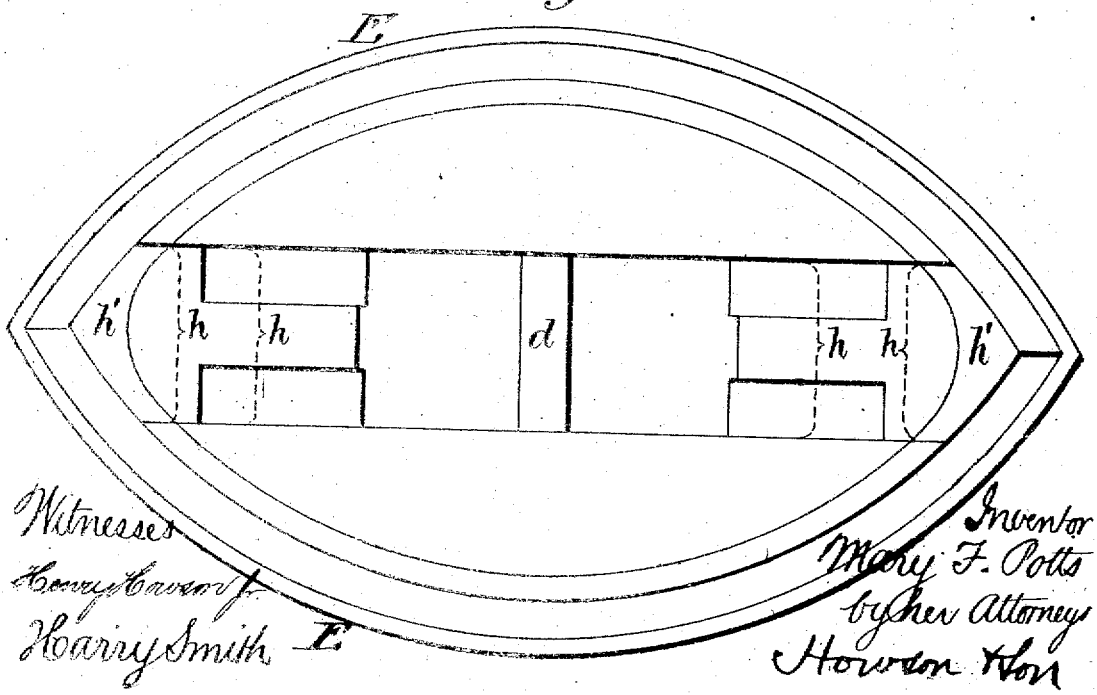
Figure 3:
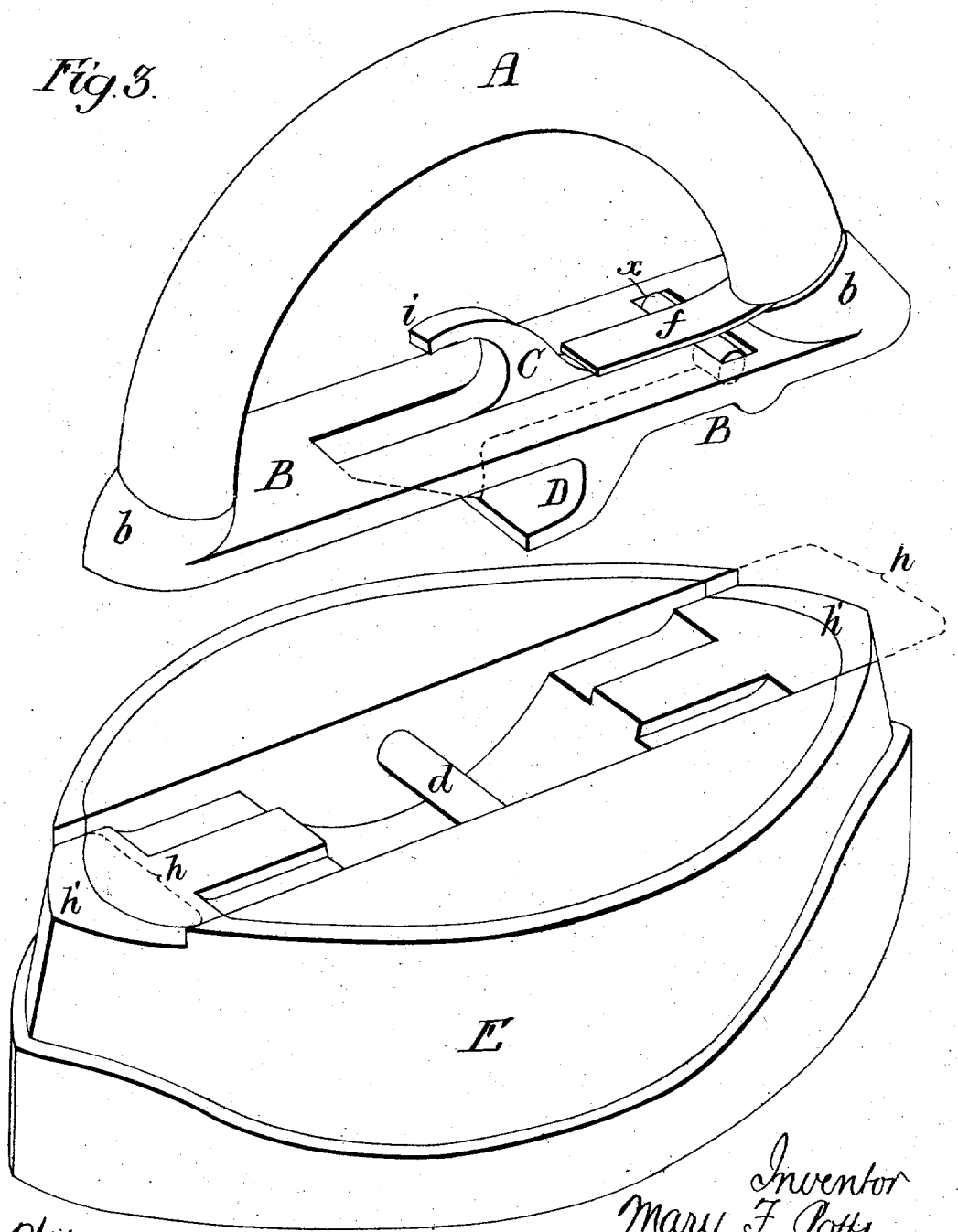
Figure 4:
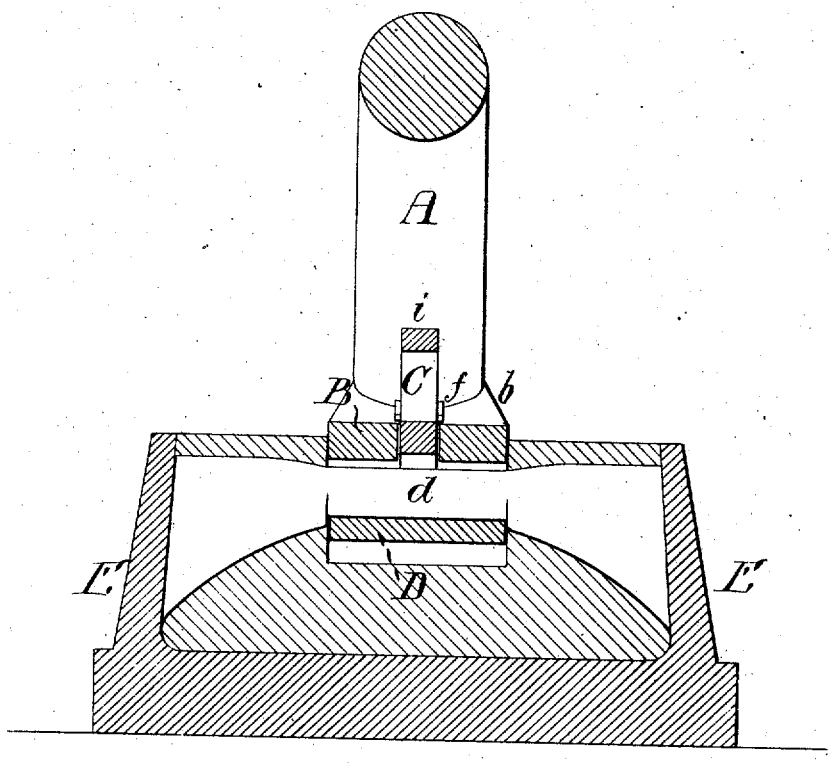

In the accompanying drawings, Figure 1, Sheet 1, is a side view, partly in section, showing the handle and base of the sad-iron detached from each other; Fig. 2, a plan view of the base; Fig. 3, Sheet 2, perspective views of the handle and base detached from each other; and Fig. 4, Sheet 3, a transverse section of the sad-iron, showing the handle attached to the base.

In an ordinary sad-iron the handle, usually supported on or forming part of legs attached to the base, is straight or horizontal, so that the hand which grasps the handle must always be in the same or nearly the same position in respect to the base.

In my improved handle A the legs and top are comprised in one continuous arched piece or segment of wood, rounded transversely and presenting a handle which can be grasped at such different points in relation to the base as comfort or convenience may suggest to the operator.

The ends of the arched handle A are connected together by a plate, B, having inclined abutments *b b* for the said handle to bear against. These abutments permit the introduction of the stems of the wood-screws *a a* into the handle in the inclined direction, in which they are most available for the secure attachment of the plate B to the said handle. (See Fig. 1.)

The abutments are recessed on the under side, as shown at *p*, so as to freely admit as well as conceal the screw-heads.

The handle A, being arched and entirely of wood, is necessarily weak; but this weakness is remedied by the plate B, which is secured directly to the bases of the wooden arch, and tends to retain the same in its proper shape. The plate moreover serves the additional purpose of carrying the latching mechanism described hereinafter.

The base E of the sad-iron is made of a shape substantially similar to that described in the Letters Patent No. 103,501, granted to me May 24, 1870—that is to say, it is widest in the middle and pointed at both ends and has a smooth face bounded by two curved and comparatively sharp edges.

In the top of the base, at each end of the same, is a recess, *h*, for receiving the plate B, for insuring the proper adjustment of the handle on the base, and for preventing the lateral displacement of said handle.

The handle is made detachable from the base, and is provided with latching and releasing mechanism, which I will proceed to describe.

The plate B has on its under side a permanent hooked jaw, D, and is longitudinally slotted for the reception of the latch-lever C, which is pivoted to the plate at *x*, the lever having on its under side a projection or jaw, *m*.

A spring, *f*, confined between one end of the handle and its inclined abutment on the plate, tends to depress the lever C to its bearings.

In the base is a recess large enough for receiving the latching-jaws, and within this recess is a cross piece or bar, *d*.

On applying the handle to the base, it is so adjusted that the latch-lever will bear on and be raised by pressure on the cross-piece *d*, thereby permitting the hooked jaw D to pass beneath the said cross-piece on pushing the handle in the direction of the arrow, Fig. 1, after which the lever will be quickly depressed by the spring, the cross-piece will be confined between the jaw of the lever and the fixed jaw D of the plate B, and the handle will be locked to the base, the plate B of the handle bearing on the bottom *h'* of the recesses *h*.

The handle may be released by raising the lever, which has a suitable projection, *i*, in a central position in respect to the handle, so as to be within reach of a finger of the hand which grasps the said handle. One or more of these cross pieces or bars *d* and one or more jaws D may be used.

In my former patent, No. 103,501, I described the packing of suitable non-conducting material in a recess in the base, this recess being such that the metal was thickest in the middle of the base; but in the present instance I so form the recess that the metal shall be thickest at the opposite ends, as will be seen by reference to Fig. 1, in which G represents the packing.

The bottoms *h'* of the recesses *h* present narrow ribs as the sole metallic bearings for the plate B of the handle, and these bearings have such limited areas that their efficacy as conductors of heat from the base to the handle is restricted.

It will be seen that the cross piece or bar *d* and the locking-jaws for seizing the bar occupy a central position, so that the handle can be fitted and locked to the base whether the former occupies the position shown in Fig. 1 or the reverse position; hence there need not be any hesitancy in applying the handle to the base.

This arrangement is especially adapted to sad-irons having the handles arched and alike at both ends and bases pointed at both ends.

I claim as my invention—

1. The combination of the wooden handle A, the top and legs of which form a continuous arch, rounded transversely, with the metal connecting-plate B, secured directly to the bases of the arch, and latching mechanism carried solely by the plate, all substantially as set forth.

2. The combination of the arched handle A, of wood, with a metal plate, B, having inclined abutments or bearings for the said handle, substantially as specified.

3. The combination of the handle, the plate B, having inclined abutments recessed on the under side, and the screws *a a*.

4. The combination, in a sad-iron, of a base having in the top a recess, and a cross piece or bar therein, with a detachable handle carrying a fixed and movable jaw for seizing the said cross piece or bar, all substantially as described.

5. The combination of the wooden handle and its plate B, carrying a fixed jaw and a movable jaw, with a base constructed for being locked to and released from the said jaws, all substantially as described.

6. The combination of the handle and its plate B, the hooked jaw D, and pivoted lever C and its jaw with the base having a recess for receiving the jaw and cross-piece or bar adapted to the same, substantially as set forth.

7. The combination of the handle, its plate B, and pivoted lever C with the spring *f*, confined between the handle and its abutment on the plate, as set forth.

8. The combination of the handle and its plate B with the lever C, pivoted so as to be moved vertically, and having a projection, *i*, occupying a central position in respect to the handle, all substantially as set forth.

9. The combination of the arched handle A, made alike at both ends, and carrying centrally-situated jaws, with the base E, pointed at both ends alike, and having a central cross piece or bar adapted to the jaws, all substantially as set forth.

In testimony whereof I have signed my name to this specification in the presence of two subscribing witnesses.

MARY F. POTTS.

Witnesses:

ALEXANDER PATTERSON,
HARRY SMITH.